United States Patent
Fischer et al.

(10) Patent No.: US 7,023,334 B2
(45) Date of Patent: Apr. 4, 2006

(54) METHOD FOR ASSIGNING TIRE PRESSURE MEASUREMENT DEVICES IN A MOTOR VEHICLE TO WHEEL POSITIONS AND DEVICE FOR MEASURING THE TIRE PRESSURE

(75) Inventors: Martin Fischer, Regensburg (DE); Georges Fonzes, F-Toulouse (FR)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/238,190

(22) Filed: Sep. 10, 2002

(65) Prior Publication Data

US 2003/0076222 A1   Apr. 24, 2003

(30) Foreign Application Priority Data

Sep. 10, 2001   (DE) ................. 101 44 360

(51) Int. Cl.
   *B60C 23/00*   (2006.01)
(52) U.S. Cl. .............. 340/444; 73/146.4; 73/146.5; 340/442; 340/447
(58) Field of Classification Search ........ 340/442, 340/444, 445, 447, 443; 73/146.4, 146.5, 73/146.3, 146.8, 146.2, 146; 702/138; 116/34 R
See application file for complete search history.

(56) References Cited

U.S. PATENT DOCUMENTS

| | | | | |
|---|---|---|---|---|
| 5,808,190 A | * | 9/1998 | Ernst | 73/146.5 |
| 6,112,587 A | * | 9/2000 | Oldenettel | 73/146.5 |
| 6,204,758 B1 | * | 3/2001 | Wacker et al. | 340/444 |
| 6,237,403 B1 | * | 5/2001 | Oldenettel et al. | 73/146.5 |
| 6,259,361 B1 | * | 7/2001 | Robillard et al. | 340/447 |
| 6,278,363 B1 | * | 8/2001 | Bezek et al. | 340/442 |
| 6,435,020 B1 | | 8/2002 | Oldenettel et al. | 73/146.4 |
| 6,446,023 B1 | * | 9/2002 | Ernst | 702/138 |
| 6,571,617 B1 | * | 6/2003 | Van Niekerk et al. | 73/146 |
| 6,580,365 B1 | * | 6/2003 | Starkey | 340/447 |
| 6,633,229 B1 | * | 10/2003 | Normann et al. | 340/447 |
| 2001/0008083 A1 | * | 7/2001 | Brown | 73/146 |
| 2003/0042890 A1 | * | 3/2003 | Normann et al. | 324/162 |

FOREIGN PATENT DOCUMENTS

| | | |
|---|---|---|
| DE | 4337443 A1 | 5/1995 |
| DE | 19608478 A1 | 5/1997 |
| DE | 19849390 C2 | 5/2000 |
| DE | 19921413 C1 | 11/2000 |
| EP | 0760299 B1 | 7/1996 |
| EP | 0806307 B1 | 5/1997 |
| WO | WO99/08887 | 7/1998 |

* cited by examiner

*Primary Examiner*—Brent A. Swarthout
(74) *Attorney, Agent, or Firm*—Baker Botts L.L.P.

(57) ABSTRACT

When a vehicle travels a bend, tire pressure measurement devices (2) are assigned to wheel positions. For this purpose, it is determined by means of ABS (4) whether it is a left-hand or right-hand bend. Wheel revolution counts are then measured in each tire and sent along with identification codes to a central analysis unit (3). There the wheel revolution counts are collated with the bend data determined by the ABS. The two higher wheel revolution counts are then assigned to the side of the vehicle on the outside of the bend and the two lower wheel revolution counts are assigned to the other side of the vehicle.

11 Claims, 3 Drawing Sheets

METHOD FOR ASSIGNING TIRE PRESSURE MEASUREMENT DEVICES IN A MOTOR VEHICLE TO WHEEL POSITIONS AND DEVICE FOR MEASURING THE TIRE PRESSURE

BACKGROUND OF THE INVENTION

The invention relates to a method for assigning tire pressure measurement devices in a motor vehicle to wheel positions and a device for measuring the tire pressure in any tire on a motor vehicle.

Such devices specifically have sensors inside the tire on each wheel, which specifically measure the air pressure in-side the tire. The air pressure is sent in the form of a measured value to an analysis device located in the motor vehicle. The analysis device compares the air pressure in the tire with a minimum admissible threshold value. If the measured value is below this threshold value, the analysis device can warn the driver that the tire pressure is too low.

So that the analysis device knows exactly which tire the low air pressure message relates to, the analysis device must be informed at least once during the journey which sensor and therefore which identification code is assigned to which wheel position. A method for assigning tire pressure measurement devices to wheel positions is, for example, known from patent specification EP 0 760 299 B1. There an additional sensor in the tire is used to identify the direction of revolution of the assigned wheel and transmit this to an analysis device. The analysis device is also informed of the direction of travel of the vehicle. This means that two pressure measurement devices can be assigned to each vehicle side, i.e. left or right.

In order to allow assignment of the tire pressure measurement devices to a front or rear wheel as well, with the known method the tire pressure values are compared with target pressure values on the front axle and rear axle. As, generally, the pressure level values are lower on the front axle than on the rear axle, assignment can then be made to a front or rear wheel. The combination of both methods allows assignment to a specific wheel position.

With the known tire pressure measurement device, the direction of revolution of the wheels is identified by means of revolution direction identification sensors. Such sensors are however very complex and expensive.

SUMMARY OF THE INVENTION

The object of the invention is therefore to create a method for assigning tire pressure measurement devices in a motor vehicle to wheel positions and a device for measuring the tire pressure of any tire, ensuring simple and automatic assignment of tire pressure measurement devices to wheel positions.

This object is achieved according to the invention by a method for assigning tire pressure measurement devices in a motor vehicle to wheel positions, wherein when the motor vehicle is traveling, wheel parameters and assigned wheel positions are recorded by means of an existing driver support system located in the motor vehicle and used in the driver support system as bend data to determine whether a left-hand or right-hand bend is traveled and which bend is then being traveled, with the bend data being transferred to an analysis unit. When a bend is identified, assignment mode is activated for the tire pressure measurement devices, a sensor in each tire is used to measure a physical variable proportion to the speed of the relevant wheel and the value of the physical variable is sent along with identification codes of the relevant tire pressure measurement devices to the analysis unit in wireless fashion, and in the analysis unit the bend data is collated with the variables measured by the sensors in the tire or variables calculated from these and used to assign identification codes and therefore the tire pressure measurement devices to wheel positions.

A physical parameter, which is a measure of the speed of the wheel, is identified on each wheel along with the relevant wheel position by means of a driver support system already located in the motor vehicle. The values of the physical parameters are then analyzed in the driver support system, to determine whether a left-hand or right-hand bend is being traveled. This bend travel data is transferred to an analysis unit. In each wheel a physical parameter, which is also a measure of wheel speed, is measured by means of the respective tire pressure measurement device and sent to the analysis unit along with the tire pressure measurement device identification codes. When a bend is being traveled, in other words when the wheel speeds on the inside of the bend are lower than the wheel speeds on the outside of the bend, the values of the variables measured in the wheels are compared with the left-hand or right-hand bend data from the driver support system. This comparison can be used to assign the wheels with higher wheel speeds and the associated identification codes of the tire pressure measurement device to one side of the motor vehicle (outside of bend) and the wheels with lower speeds to the other side of the motor vehicle (in-side of bend).

Advantageous embodiments of the invention are described in the claims.

BRIEF DESCRIPTION OF THE DRAWINGS

Advantageous embodiments of the invention are explained in more detail using the diagrammatic drawings. These show.

DETAILED DESCRIPTION OF THE PREFERRED EMBODIMENTS

Figure 1:
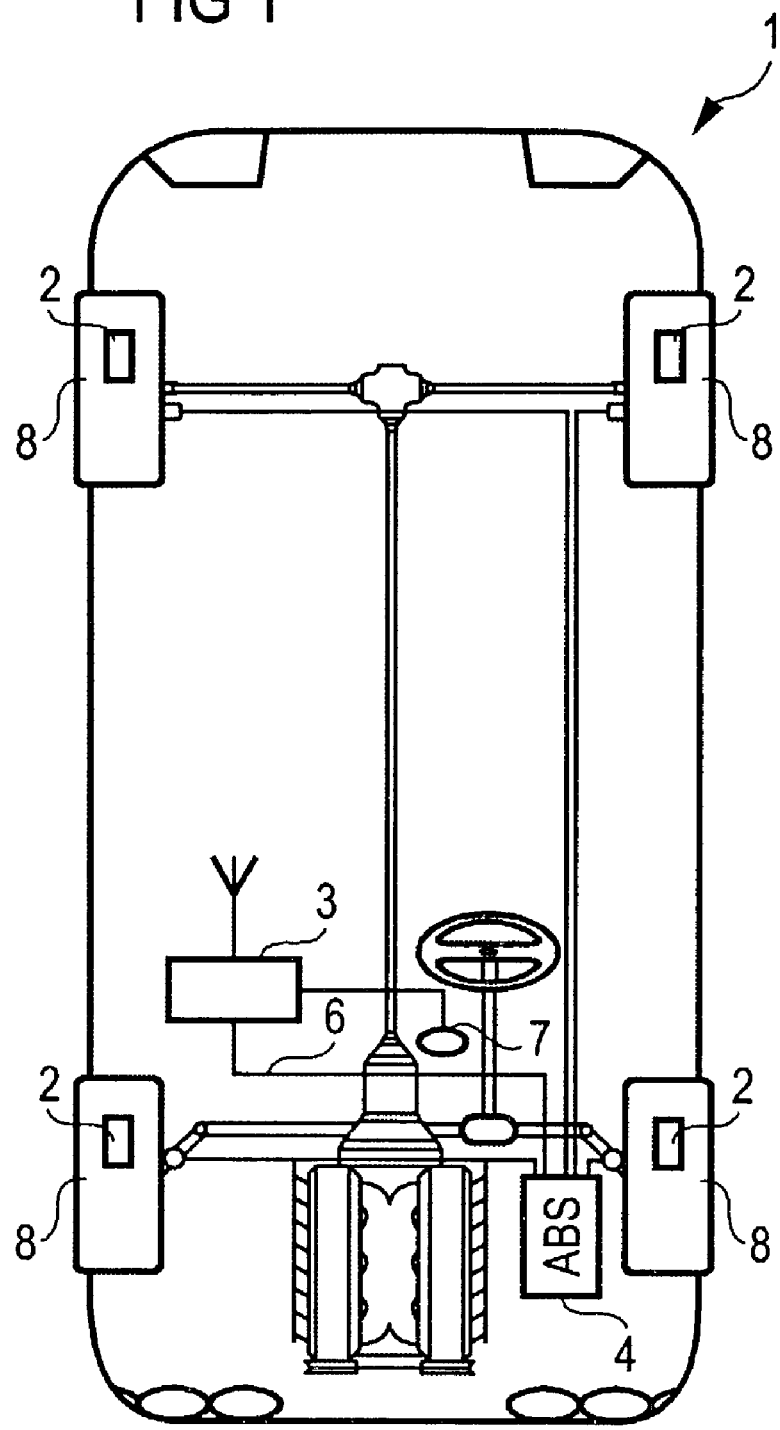
FIG. 1 a diagrammatic view of a motor vehicle with a tire pressure measurement device according to the invention, FIG. 2 a block diagram of a tire pressure measurement device, FIG. 3 a block diagram of an analysis unit in the motor vehicle, FIG. 4 a vehicle wheel with tires and FIG. 5 a motor vehicle traveling through a bend.

A device for measuring the tire pressure in any tire 8 (FIG. 1) on a motor vehicle 1 has a tire pressure measurement device 2 in each tire (including the spare wheel). This is used to measure the pressure in the tire directly and/or the temperature of the tire as a physical variable, which is a measure of the pressure in the tire. The measured physical variable is converted to an electrical signal and sent to a central analysis unit 3. The analysis unit 3 is connected to an existing driver support system 4 in the motor vehicle 1.

To operate correctly, the driver support system 4 requires physical parameters, which are a measure of the revolution count or speed of the wheels 8 and assignment to the respective wheel position. This data is then available to other electronic systems in the motor vehicle 1 and can be retrieved from there, for example via a bus system 6.

Driver support systems 4 may be drive stability or drive dynamic control systems, such as for example, an antilock system (ABS), a drive slip control system (ASR), an electronic stability program (ESP) or a traction control system. It may also refer to the engine or shift control system. It is not relevant to the invention which driver support system 4 is present in the motor vehicle 1, but that a driver support system 4 is used to determine wheel parameters, for example, wheel speeds and the associated wheel positions. Speed sensors 5 are usually located on the axles close to the wheels 8 for this purpose, said sensors measuring the wheel speeds of the relevant wheel 8 and transmitting them to the driver support system 4. The permanent assignment of wheel 8 and speed sensor 5 means that the driver support system 4 also knows the associated wheel position, i.e. where the relevant wheel is (front left, front right, rear left, rear right). The driver support system then determines, when a bend is traveled, whether it is a left-hand or right-hand bend. This data about the bend being traveled is passed on to an analysis unit 3 (see FIG. 3).

Figure 2:
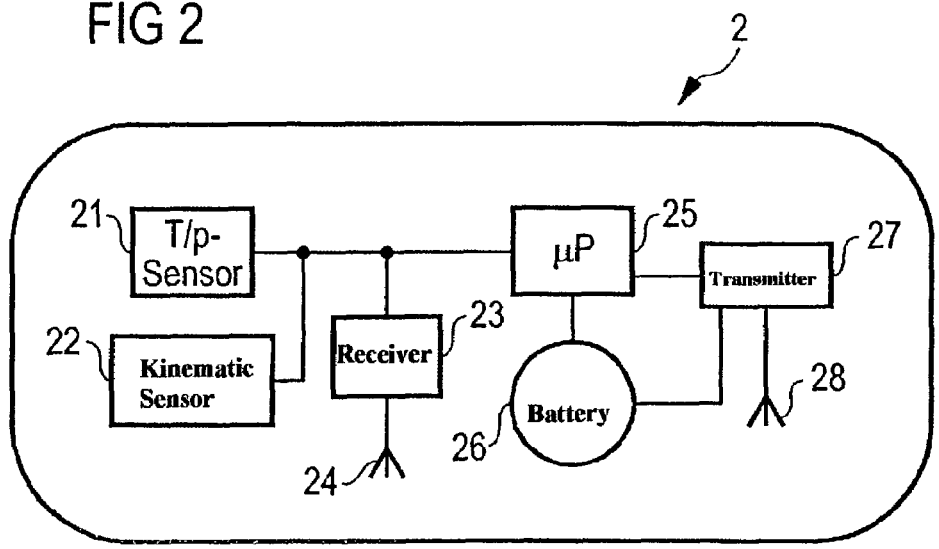

FIG. 2 shows an example of the structure of a tire pressure measurement device, as located in each tire (on the rim, on the tire bead, in the tire material or elsewhere) of each wheel 8. This tire pressure measurement device 2 has at least one pressure sensor 21, which is used to measure the pressure level of the tire. It may also have a temperature sensor. The temperature in the tire can also be used to obtain data about the tire pressure level.

The measured values are supplied to a control unit (here a microprocessor 25), which processes these and sends them along with an identification code and any other data to a transmitter 27 for transmission via a transmission antenna 28. The signals may be transmitted continuously or intermittently at predefined times at high or low frequency and in wireless fashion.

The tire pressure measurement device 2 may also have a receiver 23 with a receiver antenna 24, by means of which signals can be received from the analysis unit 3, to initiate a pressure measurement, for example. Transmission and receiver antennas 28, 24 may also be combined in a single antenna. The antennas 24, 28 may be located in the tire in the form of coils or a rod antenna, i.e. in or inside on the tire material, on the rim or as part of the air valve.

All the components of the tire pressure measurement device 2 are supplied with current and voltage by a battery 26. The battery 26 may not be necessary, if the tire pressure measurement device 2 takes its power from the received signal (transponder principle).

The tire pressure measurement device 2 also has a kinematic sensor 22. This kinematic sensor 22 measures a physical variable, which only has to be measured during motion, i.e. during a journey. This variable is a measure of the revolution or speed of the wheel 8. In this way, for example, the centrifugal force occurring as the wheel 8 revolves can be measured using a centrifugal sensor as a kinematic sensor 22. The centrifugal force can then be used to determine the speed or revolution count of the relevant wheel 8.

The values measured by the kinematic sensor 22 are also fed to the microprocessor 25 and sent along with the pressure and/or temperature value and the tire-specific identification code via the transmitter 27 to the analysis unit 3. The transmitted signal can contain all the measured values, such as identification code, pressure value, revolution count and other data.

Figure 3:
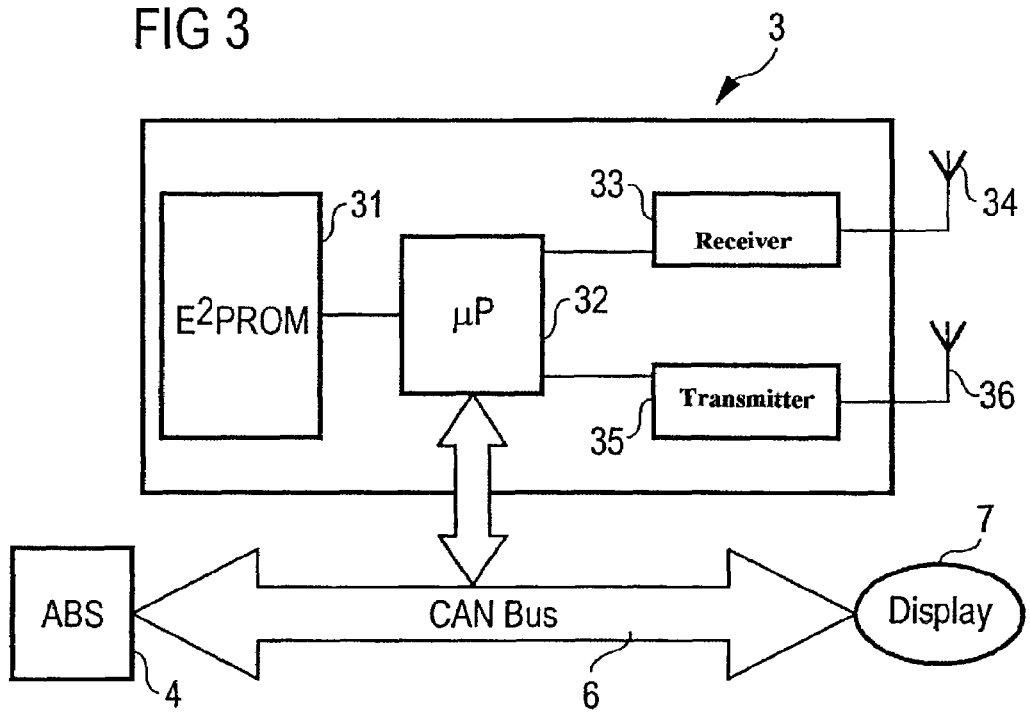

FIG. 3 shows the central analysis unit 3 in detail. The analysis unit 3 receives the signals transmitted by each tire pressure measurement device 2 via a receiver 33 with receiver antenna 34. The receiver 33 feeds every received and demodulated signal to a microprocessor 32. The signals are analyzed in the microprocessor 32 and the values measured by the tire pressure measurement device 2 are extracted. The values can then be converted, if necessary, so that they can be compared with values obtained from the driver support system 4. All values can be stored in a memory 31.

Target and reference values for tire pressure level, temperature, identification code assignment to wheel positions, etc., can also be stored in the memory 31.

The analysis unit 3 is connected to a bus system 6 in the motor vehicle 1, for example a CAN bus. The microprocessor 32 can use this bus 6 to obtain data from other systems in the motor vehicle 1, such as the driver support system 4. In this way the data relating to whether the bend being traveled is left-hand or right-hand is transmitted by the driver support system 4 to the analysis unit 3. The analysis unit 3 can then collate this data with the physical variables measured in the tires.

The analysis unit 3 can use the bus 6 to pass data and warnings to a display unit 7 connected to the bus 6. The display unit 7 is advantageously located in the field of vision of the driver, for example on the dashboard.

The analysis unit 3 may also have a transmitter 35, which it can use to send signals to the individual tire pressure measurement devices 2 in the tires, in order for example to retrieve the pressure level values for the tires or other measured variables from the tire pressure measurement device 2.

In normal operation the pressure level values for the individual tires are sent along with the tire pressure measurement device 2 identification code to the analysis unit 3. This compares the values on the basis of the identification code with the minimum or maximum admissible pressure values stored for the identification code and therefore for the wheel position (reference or target values), which were previously stored in the memory. If the values are below or above the reference values, a warning signal is emitted, in-forming the driver of the wheel position, in which a tire has too low or too high a pressure.

So that each tire pressure measurement device 2 is specifically assigned to a wheel position, assignment mode must first be activated. This then starts up, according to the invention, after the vehicle has been started, when a bend is identified. For this, the wheel speeds of the individual wheels 8 are used in the driver support system 4 to determine whether it is a right-hand or left-hand bend. Only this bend data is retrieved by the analysis unit 3. For it is then determined from the wheel 8 parameters, such as the revolution counts of the wheels 8 or the wheel speeds calculated from these, whether there is a bend and whether a left-hand or right-hand bend is being traveled. This is determined from the wheel position of the faster revolving wheels 8, with the extent of the difference between the faster revolving wheels 8 and the slower revolving wheels 8 being proportional to the angle of the steered wheels 8.

Once the data about a traveled bend is available, including whether the bend being traveled is left-hand or right-hand, this bend data is used to activate assignment mode and the bend data is transferred from there to the analysis unit 3.

After activation of assignment mode, a physical variable proportional to the revolution of the wheel 8 is measured in each tire. This may be the centrifugal acceleration, for ex-ample, which occurs during the revolving movement. This physical variable is sent along with the tire pressure measurement device 2 identification code to the analysis unit 3, if a command to initiate assignment mode has already been received.

As it is already known in the analysis unit 3 that a left-hand or right-hand bend is being traveled, a comparison of this bend data with the corresponding variables measured in the tires can be used to assign the identification codes to wheel positions. For, when two faster revolving wheels 8 are measured and the driver support system 4 already knows whether a left-hand or right-hand bend is being traveled, for example in the case of a left-hand bend, the position of the faster revolving wheels 8 (determined by the measurement in the tires 8) and their identification codes can be assigned to the right side of the motor vehicle 1. Otherwise, in the case of a right-hand bend, the position of the faster revolving wheels 8 (determined by the measurement in the tires 8) and their identification codes can be assigned to the left side of the motor vehicle 1.

Precise knowledge is obtained from the bend data, which comes from the driver support system 4, about which two wheels 8 are in the outside position on the bend being traveled and which two wheels 8 are in the inside position on the bend. The outside wheels 8 have a higher wheel speed than the in-side wheels 8. If the bend data is compared by the analysis unit 3 with that measured in the tires, the identification codes with higher wheel speeds can be assigned to a vehicle side (in the case of a left-hand bend, this is the right side of the vehicle). The wheels 8 with the lower wheel speeds are assigned to the other side. The analysis unit 3 then knows the identification codes of the tire pressure measurement de-vices 2 and knows which two tire pressure measurement devices 2 are in tires on the left side and which are on the right side.

This assignment is then stored for the further operation of the motor vehicle 1. It can then be specified that the assignment is only overwritten if the motor vehicle 1 has stopped for longer than the time required for a tire change. For a tire/wheel change could then take place, in which new tires are fitted with tire pressure measurement device identification codes not yet known to the system or the wheel position of the tires may be changed.

The revolution count or speed of a wheel 8 can be determined using the centrifugal acceleration. The centrifugal acceleration of a point on the rim 9 depends on the speed of the wheel 8. As the wheel speeds of the wheels 8 on the inside of the bend are lower than those of the wheels 8 on the outside of the bend, the difference between the wheel speeds on the left side and those on the right side during the bend can be used to identify the right and left sides of the vehicle.

The wheel speeds or revolution count measured in the tires 8 can also be compared with the vehicle speed identified by the driver support system 4. The wheels which are faster than the vehicle speed on the bend are then on the outside and the others on the inside. As the driver support system 4 knows which bend is being traveled, the values can be compared to assign left and right wheel positions.

Figure 4:
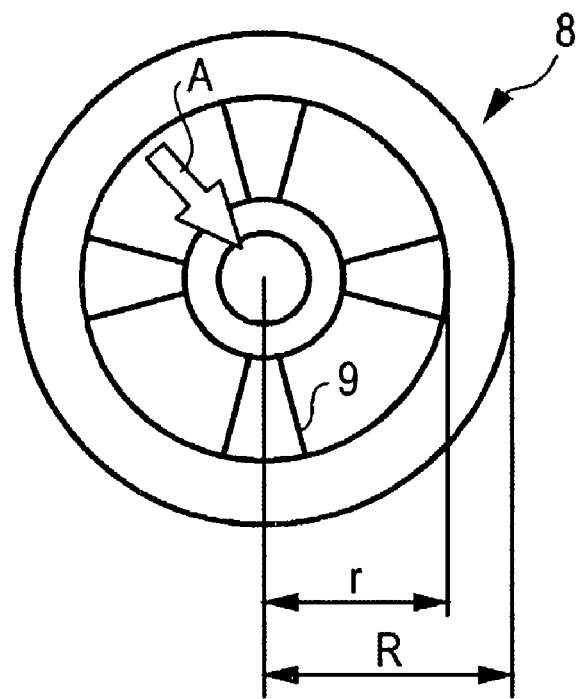
Figure 5:
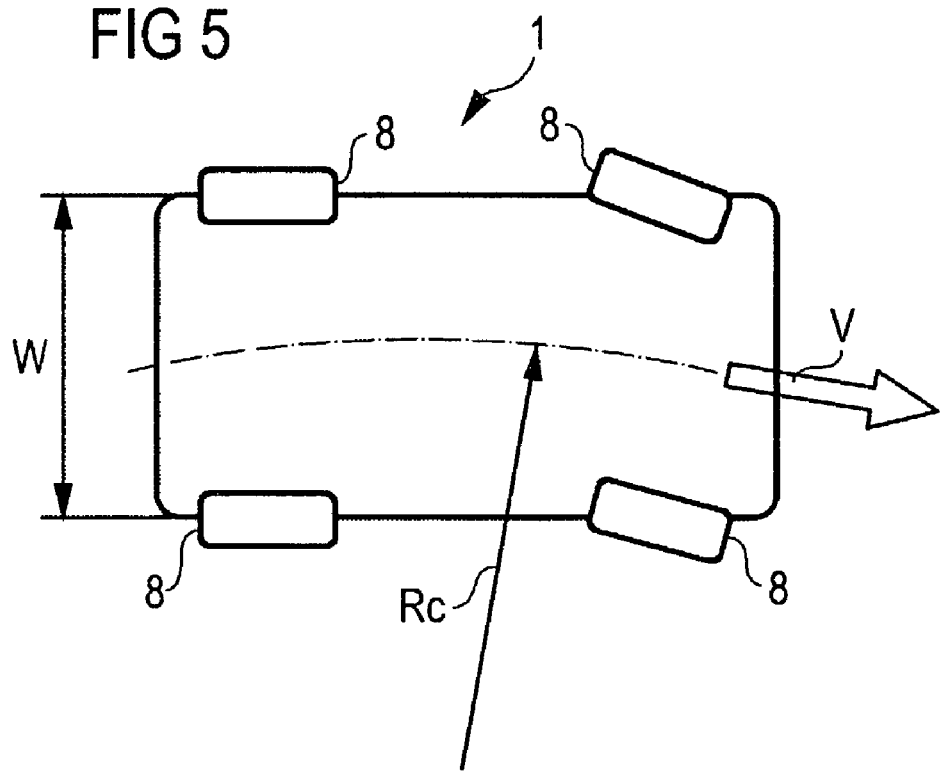

If, as shown in FIGS. 4 and 5, vehicle speed is designated as v, radius of the wheels 8 as R, radius of the rim 9 as r, the centrifugal acceleration $a_z$ is obtained as follows:

$$a_z = \left(\frac{v}{R}\right)^2 * r$$

On a bend the centrifugal acceleration $a_{zi}$ of the wheels 8 on the inside of the bend and the centrifugal acceleration azo of the wheels 8 on the outside of the bend can be calculated as follows:

$$a_{zi} = \left(1 - \frac{w}{2 \cdot R_c}\right)^2 * \left(\frac{v}{R}\right)^2 * r$$

$$a_{zo} = \left(1 - \frac{w}{2 \cdot R_c}\right)^2 * \left(\frac{v}{R}\right)^2 * r$$

where w=width of vehicle, Rc=radius of bend.

The narrower the bend, i.e. the smaller the bend radius $R_c$, the bigger the difference in the centrifugal acceleration values and therefore also in the speed of the wheels 8 on the outside of the bend and of the wheels 8 on the inside of the bend. In this way the wheels 8 can be clearly distinguished in respect of the left and right side of the vehicle on the basis of their centrifugal acceleration, revolution counts or speed.

So that simple and cheap sensors can be used to measure acceleration, the distinction between the inside and outside wheels on the basis of their revolution count is not made un-til a bend is traveled, on which the different speeds of the inside and outside wheels 8 are clearly measurable, i.e. depending on vehicle speed, only below an associated, maximum bend radius (target value). Only when the bend radius is smaller than this target value and this is identified by means of the driver support system 4, is assignment mode activated.

The tire pressure measurement devices 2 may be assigned to the wheels on the front axle or rear axle, for example, by means of pressure measurement and a comparison of the pressure measurement values in all tires. As it is known that generally the tire pressure in the front wheels is lower than that in the rear wheels, the wheels 8 can be assigned using the tire pressure.

If this is combined with assignment of left and right according to the invention, clear assignment of an identification code (i.e. a tire pressure measurement device 2) to a wheel position is determined.

Assignment of tire pressure measurement devices 2 to wheel positions at the front and rear can also be determined by what is known as a vibration method. If the vehicle travels over a bump in the ground, for example, the pressure in the front tires increases briefly first, followed by the pressure in the rear wheels. By analyzing the pressure pattern in the individual tires over time, it is possible to determine front and rear of the vehicle for a known direction of travel. However the pressure in the tires has to be recorded over quite a long period to do this.

If this is combined with the assignment according to the invention of tire pressure measurement devices 2 to wheel positions, clear assignment of all identification codes to the wheel positions is determined, so that in normal operation of the tire pressure measurement devices 2, the wheel position is known for each identification code.

"Front-rear identification" could also be achieved by measuring the temperatures in the tires, as the temperature in the front tires is generally higher than the temperature in the rear tires. Also the temperature and pressure in the tire could also be analyzed during braking, as during braking there is greater stress on the front wheels, so more heat is produced there and the pressure is higher.

Also front and rear tire pressure measurement devices 2 could be identified by analyzing the amplitudes of the signals received by the analysis unit 3, if the analysis unit 3 is either significantly nearer to the front wheels or significantly nearer to the rear wheels.

With the method according to the invention the tolerances of the sensors used 5, 21, 22 play a negligible role, as only the differences in acceleration or wheel revolution counts are used, since the values of wheel variables on one side of the vehicle are compared with those on the other side of the vehicle and then collated with the bend data from the driver support system 4.

Piezoresistive sensors, which measure very accurately and only have small tolerances, may be used as acceleration sensors (which measure centrifugal acceleration here).

The invention has the advantage that a central analysis unit 3 can be used with a single receiver antenna 34. Signal transfer between tire pressure measurement devices 2 and the analysis unit 3 can be wireless. No wires/cables need to be attached to the wheels 8.

The method according to the invention also has the advantage that the spare wheel does not have to be taken into account—even if it transmits pressure signals and identification codes, as the spare wheel does not revolve during travel. Wheel revolution counts and centrifugal acceleration values are therefore not measured. This means that it is not possible to assign the identification code of the spare wheel to wheel positions. Tire pressure measurement devices 2 are therefore assigned only to existing wheel positions, when the wheel 8 also revolves and a bend being traveled is identified by means of a driver support system 4.

It is sufficient if centrifugal forces are measured in the tires. These are proportional to the wheel speed and the wheel revolution count. Centrifugal forces can be used to calculate the wheel revolution count simply. It is however irrelevant for the invention whether the centrifugal acceleration or the wheel revolution count is measured in the tire. All that is needed is information about which two wheels 8 are revolving faster and which more slowly. The driver support system 4 knows on which side of the vehicle the two faster wheels 8 are located and on which side the two slower wheels 8 are located on the bend, as the driver sup-port system 4 determines what sort of bend is being traveled.

Once the identification codes have been assigned to wheel positions, the switch can be made to normal operation, in which the tire pressure values in the individual tires are monitored, for as long as the engine is running. Assignment is maintained even when the engine stops for a short time.

The invention claimed is:

1. A method for assigning tire pressure measurement devices in a motor vehicle to wheel positions, said method comprising:
    recording, when the motor vehicle is traveling, wheel parameters and assigned wheel positions via an existing driver support system located in the motor vehicle, said wheel parameters and assigned wheel position used in the driver support system as turn data to determine whether a left-hand or right-hand bend is traveled and which turn is then being traveled, said turn data from the existing driver support system transmitted to an analysis unit,
    activating, when a turn is identified, an assignment mode for tire pressure measurement devices located in each tire,
    measuring via a sensor in each tire a physical variable proportional to the speed of the relevant wheel, wirelessly transmitting the value of the physical variable with identification code data of the relevant tire pressure measurement devices to the analysis unit
    comparing in the analysis unit, the turn data from said existing driver support system and the physical variable values measured by the sensors in the tire or data calculated from the physical variable values, and
    assigning identification codes and the tire pressure measurement devices to particular wheel positions.

2. A method according to claim 1, wherein centrifugal acceleration is measured in the tires as a physical variable and wheel revolution counts are calculated from the centrifugal acceleration values, which are then compared with the turn data from the driver support system.

3. A method according to claim 2, wherein assignment of the tire pressure measurement devices to wheel positions takes place automatically at least once after starting the motor vehicle, as soon as a turn with a turn radius below a target value is identified.

4. A method according to claim 1, wherein the tire pressure measurement devices are assigned to wheel positions on the front axle and rear axle on the basis of pressure measurement by the tire pressure measurement devices and analysis of the measured values over time.

5. An arrangement for measuring the tire pressure of a plurality of wheels of a motor vehicle, comprising:
    a sensor arrangement within each wheel coupled with a data transceiver unit, said sensor arrangement comprising a pressure sensor and a sensor for measuring a physical variable proportional to wheel speed, said data transceiver unit transmits physical variable and corresponding pressure data;
    a driver support system for receiving and evaluating a plurality of travel/vehicle information;
    an evaluation unit coupled with a data transceiver for transmitting and receiving data from said sensor arrangement coupled with said data transceiver unit, wherein said driver support system provides turn data to determine whether a left-hand or right-hand turn is traveled to said evaluation unit; wherein said evaluation unit assigns, from the transmitted physical variable data and the turn data from the existing driver support system, tire pressure values to respective wheels of the motor vehicle.

6. An arrangement as in claim 5, wherein the sensor for measuring the physical variable is a kinematic sensor.

7. An arrangement as in claim 5, wherein the sensor arrangement comprises a microcontroller coupled with said sensors and said transceiver.

8. An arrangement as in claim 5, wherein the driver support system is a antilock system.

9. An arrangement as in claim 5, wherein the driver support system is a drive slip control system.

10. An arrangement as in claim 5, wherein the driver support system is an electronic stability program system.

11. An arrangement as in claim 5, wherein the driver support system is a traction control system.

* * * * *